Figure 1:
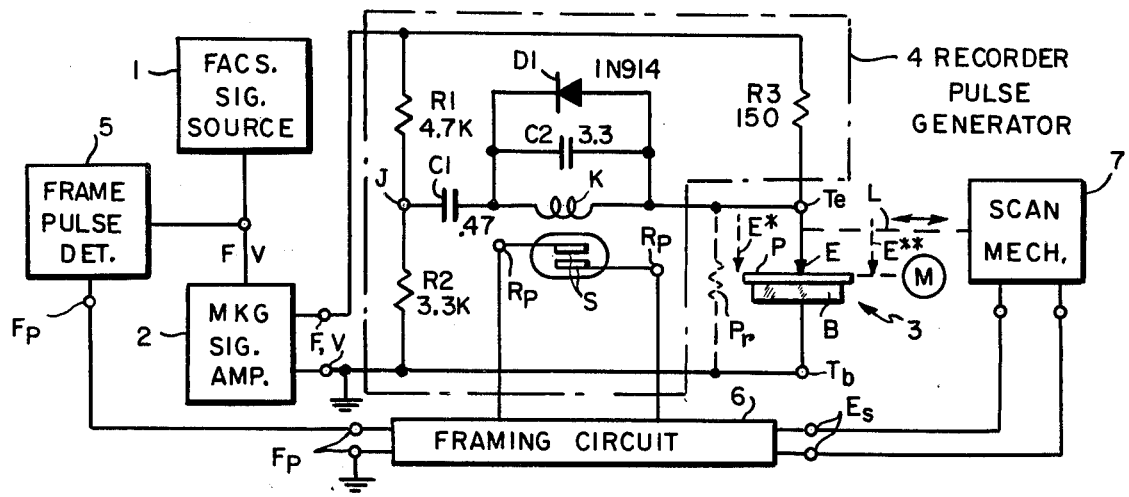

United States Patent [19]

Vano

[11] 4,148,075
[45] Apr. 3, 1979

[54] FRAMING SIGNAL GENERATOR FOR ELECTRICAL RECORDERS

[75] Inventor: Gerald L. Vano, Brockton, Mass.

[73] Assignee: Alden Research Foundation, Westboro, Mass.

[21] Appl. No.: 868,758

[22] Filed: Jan. 12, 1978

[51] Int. Cl.² .............................................. H04N 5/12
[52] U.S. Cl. ................................... 358/267; 358/296; 346/165
[58] Field of Search ............... 358/264, 279, 267, 268; 346/165; 359/296

[56] References Cited

U.S. PATENT DOCUMENTS

| 3,184,546 | 5/1965 | Smith | 358/267 |
| 3,207,846 | 9/1965 | Murphy | 358/267 |

*Primary Examiner*—Robert L. Griffin
*Assistant Examiner*—Edward L. Coles

*Attorney, Agent, or Firm*—James H. Grover

[57] ABSTRACT

A facsimile recorder for marking an electrosensitive web with a remote scanner signal including a periodically interrupted framing signal and a video signal comprises a scanning electrode and a cooperative electrode for marking the signals on the web during successive scans across the web. Scanning of the web is controlled by a framing circuit which compares the remote scanner framing signal with a recorder generated signal and uses the asynchronism of the two signals to control the scanning electrode until it frames the recorded scanner signal on the web. The recorder pulse generator comprises means sensing the voltage impressed through the web by the scanner signal. When the scan completes its crossing of the web the voltage drop across the scanning electrodes increases producing a recorder pulse which is delayed and applied to the framing circuit.

10 Claims, 2 Drawing Figures

FRAMING SIGNAL GENERATOR FOR ELECTRICAL RECORDERS

BACKGROUND OF THE INVENTION

In graphic recording of electrical signals, for example facsimile signals electrically marked during line by line scanning across a moving web, it is not only necessary that the applied facsimile signals received from independent equipment occur at the same rate as the line by line scanning of the web, it is also necessary that sucessive lines of received signals be in phase with the line scan of the web. That is, the start of each line of facsimile signals must be brought into coincidence with the start of line recording scan of the web so that the recorded information is framed on the web. The process of bringing the scanning of the web into phase with the incoming signals is termed framing.

In facsimile recorders scanning of electrosensitive paper or like web is effected by scan means moved or commutated by a driver. For example, in electrolytic recorders a motor drives a helical electrode curved around a drum or a number of styli carried on an endless belt. It is customary to derive a phasing pulse from the scan means, which pulse is called a recorder pulse or start of line pulse or signal to distinguish it from the framing pulse or signal which constitutes a part of the incoming facsimile signal. One form of facsimile framing signal is a series of substantially continuous sinusoidal modulated lines interrupted or altered for a short interval between each line. This framing signal or tone is transmitted for seconds before the transmission of graphic facsimile information, and a framing pulse can be derived from the interval between each line of tone for comparison with the recorder pulse or framing signal.

Typically the recorder pulse or framing signal has been derived from the recorder scan means by electromechanical or electromagnetic means. For example, a scanning helix drum or a stylus on a scanning belt can generate a pulse just before each scan of a recording web by momentarily closing a switch mechanically or magnetically. Mechanical switches closed millions of times are themselves notoriously subject to failure, and may undesirably affect the recording characteristics of the stylus. Magnetic reed switches are relatively free from wear but are difficult to adjust for precise closure at a selected position of the scan means. And since the preferred metals for stylii, e.g. stainless steel, are weakly-or non-magnetic, they cannot be used with reed switches.

Accordingly, the objects of the present invention are to provide a way of generating a graphic recorder framing signal, which avoids use of electromechanical or electromagnetic devices and is free of their adjustment and maintenance problems, and which utilizes the available interrupted framing tone of facsimile signals.

STATEMENT OF INVENTION

According to the invention, in elecrical recording apparatus including scan means for marking through an electrosensitive web with graphic electric signals including a periodically altered framing signal, the apparatus including framing means for comparing a start of scan signal with the framing signal, a start of scan signal generator comprises, circuit means adapted to be coupled between the scan means and the framing means, the circuit means including means for sensing alteration of the framing signal voltage drop through the web between scans, and switching means responsive to alteration of the voltage drop to produce a start of scan signal for comparison with the framing signal so that asynchronism of the framing signal and start signal causes the framing means to bring the two signals into phase when the framing signals are framed on the web.

DRAWING

Figure 2:
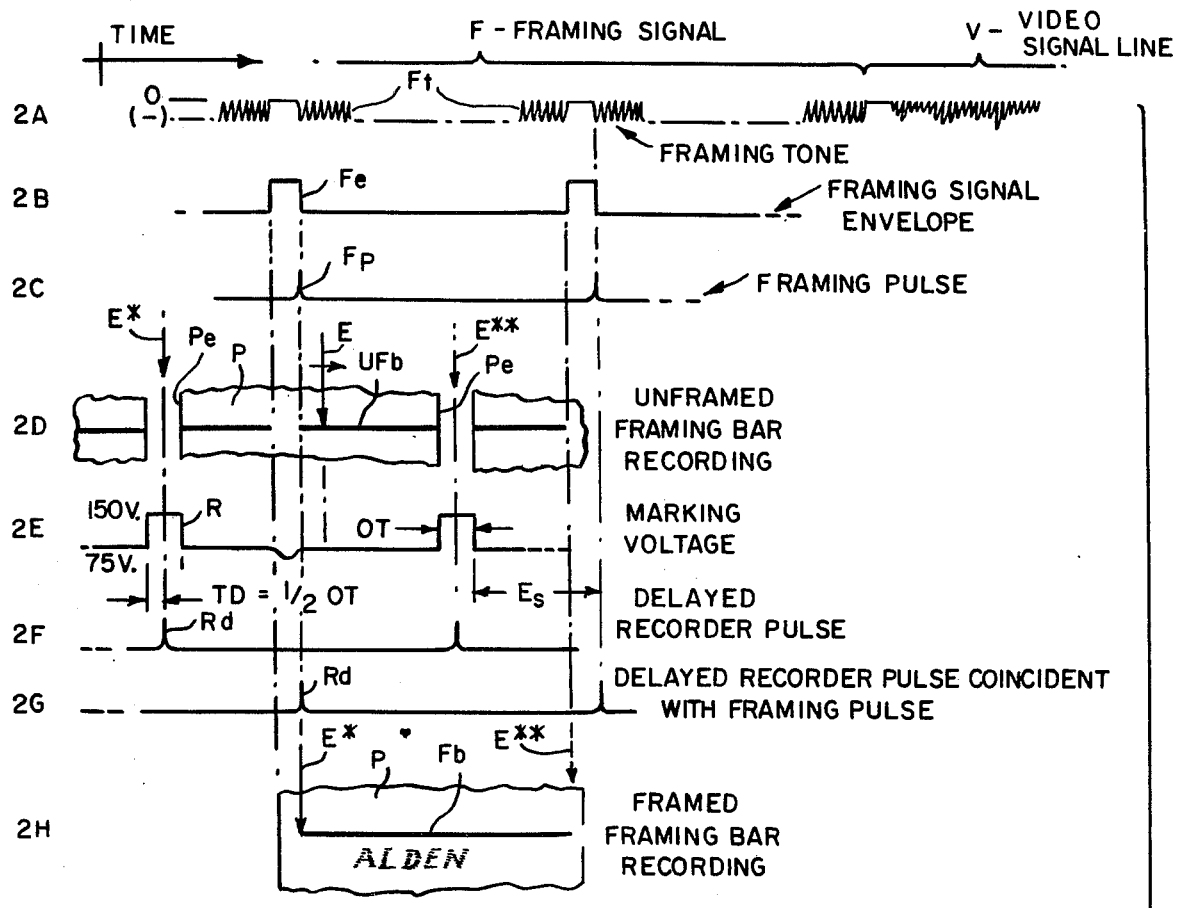

FIG. 1 is a schematic diagram of an electrical signal recorder according to the invention; and FIG. 2 is a graph on a horizontal time scale of voltage waveforms in the recorder of FIG. 1.

DESCRIPTION

The facsimile recorder shown in FIG. 1 receives from a remote or independent source 1 a facsimile signal which, as shown in voltage versus time waveform 2A of FIG. 2, includes an initial framing signal F of one half second duration of modulated framing tone Ft interrupted approximately 5% (sometimes a higher percent) of each half second which is also the duration of each line or video or graphic information signals V which follow about fifteen seconds of framing signals. The framing signals F and the video signals V are applied through a marking signal amplifier 2 to a recorder 3 comprising a scanning electrode E and a cooperative blade electrode B between which a web of electrosensitive recording paper P is fed by a motor M as shown, for example in U.S. Pat. No. 3,369,250, incorporated by reference herein. As shown at 2B the envelope Fe of the framing signal F is rectified in a frame pulse detector 5 wherein a framing pulse Fp (waveform 2C) is derived at the beginning of each line of framing tone and applied to a framing circuit 6 such as that shown in U.S. Pat. No. 2,686,832 which is incorporated herein by reference. The recorder pulse generator 4 of the present invention enclosed in dot-dash lines also applies a recorder pulse Rp to the framing circuit 6 which adjusts the cycling of a mechanism 7 driving the scanning electrode E by applying an error or correction signal Es to the scan mechanism 7 until the electrode E scans the paper P in phase with the incoming facsimile framing signals F.

The electrode E is shown schematically as a stylus moved by the scan mechanism, e.g. a motor and belt, between positions E* and E**. In leaving and entering these positions the stylus, which may be one of several on the belt, moves off the paper or out of recording relation to the paper web P for a short interval between each scan across the web between positions E* and E**. A similar interval between scans, called the off time, occurs with a facsimile helix electrode curved less than 360° around a scanning drain, or with a commutated series of stationary recording electrodes such as shown in U.S. Pat. No. 3,827,056. The present invention makes use of the above described recording off time between successive scans of the recording paper to generate the recorder pulse R which is compared with the framing pulse Fp for framing the framing signals F and the video signals V on the paper web P.

The framing signal tone Ft and later the video signals V are applied from the marking signal amplifier 2 to terminals F,V one of which is grounded and connected to the terminal Tb of the blade electrode B of the recorder 3. The other terminal is connected through a protective resistor R3 to the terminal Te of the scanning electrode E. The recording circuit is completed by the resistance Pr of the electrosensitive paper P which is shown in dashed line between the electrode terminals Te and Tb.

The recorder pulse generator circuit 4 is connected between the signal terminals F,V and the electrode terminals Te and Tb. A wheatstone bridge is formed by two fixed resistors R1 and R2 on one side, and on the other side by the protective resistor R3 and the paper resistance Pr. The bridge is crossed by the inductive coil K connected in series with a capacitor C1 between the junction J of resistors R1 and R2 and the junction J of resistors R1 and R2 and the junction at the scan electrode terminal Te of resistor R3 and the paper resistance Pr. The coil K is associated with and electromagnetically closes a reed switch S when the voltage between the junctions J and Te crosses a threshold of unbalance sufficient to energize the coil K. A capacitor C1 in series with the inductance of the coil K passes only abruptly positive going changes in the marking voltage RI. Negative going changes are shunted by a switching diode D1 or integrated by an averaging capacitor C2.

The values of resistor R1, R2 and R3 are selected so as to maintain the bridge balanced and the switch S open when the paper resistance Pr is present between the recording electrodes E and B. When the framing tone signal Ft is applied through the paper while the scanning electrode is in contact with the paper the marking voltage drop through the paper is relatively low owing to the electroconductivity of the paper. As shown in waveforms 2D and 2E of FIG. 2, when the stylus scanning electrode E is crossing the paper web P and is in electrical contact with the paper, the voltage drop due to the paper resistance Pr is, for example, 75 volts. But when the stylus crosses off the paper, leaving an infinite or very high resistance between the electrode terminals Te and Tb, the voltage drop across the terminals rises to the maximum applied by the marking signal amplifier, for example 150 volts. The excursion from 75 volts to 150 volts between the time when the scanning electrode E crosses beyond one edge Pe of the paper P and begins another crossing at the opposite paper edge Pe (waveforms 2D and 2E of FIG. 2).

In diagram 2D the recording paper is shown out of phase by lateral displacement with respect to the remote scanner signals 2A, 2B and 2C, for the purpose of illustrating the lack of phasing of the scanning electrode E with the incoming facsimile signals F,V. The subesequent lateral shifting of the paper P in diagram 2H represents a timewise adjustment of the starting position of the scanning electrode E into phase with the incoming facsimile signals, not a physical displacement of the paper. As shown in diagram 2D the recorder's scanning electrode E randomly starts to scan at position E* out of phase with the incoming framing pulse Fp. Consequently the framing tone Ft is recorded from one extreme edge Pe of the recording paper until the periodic interruption of the one occurs. The framing tone is marked as a solid line called the (unframed) framing bar UFb which continues after the midscan interruption to the other extreme edge Pe of the paper. At this point the scanning electrode leaves the paper and encounters an abrupt change in voltage drop with respect to the blade electrode B and terminal Te as shown in waveform 2E of FIG. 2.

The abrupt change in voltage at terminal Te unbalances the bridge causing a momentary flow of current through the coil K until the series capacitor C1 is charged. The inductance of the coil and reactance of the capacitor C1 introduce a time delay between the initial rise of the marking voltage 2E and the delayed recorder pulse Rd generated by the closing of the reed switch S and appearing at the recorder pulse output terminals Rp. The value of capacitor C1 is selected such that the delay time (TD in waveform 2F) is approximately one half the off paper time OT. This delay TD provides margins at the right and left recordings of the framing and video signals F,V shown on the paper P in diagram 2H.

The delayed recorder pulse Rd of waveform 2F is compared with the framing pulse Fp of waveform 2C in the framing circuit 6. The error signal Es (FIGS. 1 and 2E) resulting from asynchronism of the compared pulses adjusts the speed and phase of the scan drive mechanism 7 in a known way to bring the delayed recorder pulse Rd into coincidence with the framing pulse Fp.

Thus the recorder pulse generator 4 of the present invention eliminates electromechanical and electromagnetic recorder pulse devices and makes possible the completely electronic generation of the recorder pulse needed for framing.

It should be understood that the present disclosure is for the purpose of illustration only and that this invention includes all modifications and equivalents which fall within the scope of the appended claims.

I claim:

1. In electrical recording apparatus including scan means for marking through an electrosensitive web with graphic electric signals including a framing signal, the apparatus including framing means for comparing a start of scan signal with the framing signal, a start of scan signal generator comprising:
   circuit means adapted to be coupled between the scan means and the framing means, the circuit means including means for sensing alteration of the framing signal voltage drop through the web during scans; and
   switching means responsive to alteration of the voltage drop to produce a start of scan signal for comparison with the framing signal so that asynchronism of the framing signal and start of scan signal causes the framing means to bring the two signals into phase when the framing signals are framed on the web.

2. Apparatus according to claim 1 wherein the sensing circuit comprises a bridge with two parallel resistive sides each carrying the framing signal, one side including the resistance of the web and a series resistance having a common junction therewith, the other side comprising two series resistors with a second common junction, and threshold means connected between the junctions.

3. Apparatus according to claim 1 wherein the circuit means senses the non-marking web voltage drop during the interval between crossings of the web by the scanner electrode.

4. Apparatus according to claim 3 wherein the circuit means includes means to delay the start of scan signal for a portion of the interval.

5. Apparatus according to claim 3 wherein the circuit means includes means to delay the start of scan signal at the beginning of the interval.

6. Apparatus according to claim 5 wherein the circuit means includes means to delay the start of scan signal for a portion of the interval.

7. Apparatus according to claim 5 including switching means responsive to the recorder pulse producing means to transmit the pulse to a framing means.

8. Apparatus according to claim 7 wherein the switching means comprises an inductance.

9. Apparatus according to claim 8 wherein the circuit means includes capacitance means forming a time delay network with the inductance.

10. Apparatus for recording on an electrically responsive web with an electrical voltage including a framing signal, comprising:

scanner electrode means for applying the signals to the web during repeated scans across the width of the web;

means to control the scanning of the web by the scanner electrode means;

means for feeding the web relative to the scanner electrode means as the framing signal is applied through the web;

circuit means coupled to the scanner electrode means for sensing the framing signal voltage drop between the electrodes including means responsive to alteration of the voltage drop to produce a recorder signal after the scanning electrode means crosses the web; and means for comparing the recorder signal with the framing signal and responsive to asynchronism of the two signals to cause the control means to bring the two signals substantially into coincidence so that the framing signals are framed on the web.

* * * * *